April 27, 1943. H. E. HODGSON ET AL 2,317,529
POWER DRIVEN VALVE AND THE LIKE
Filed April 10, 1939
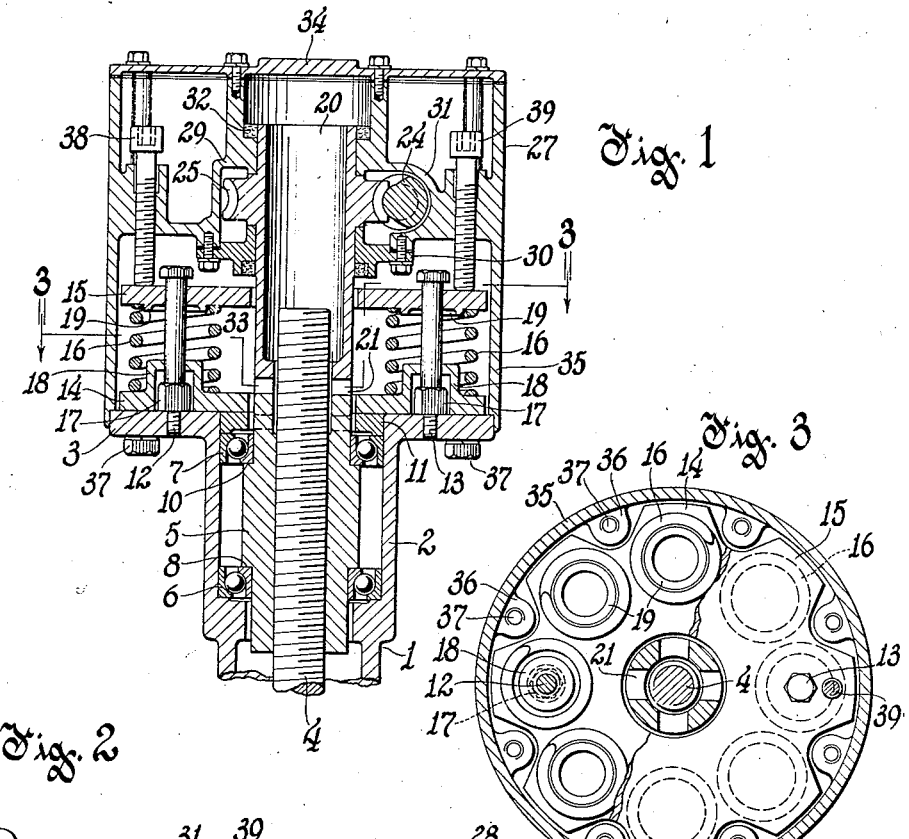
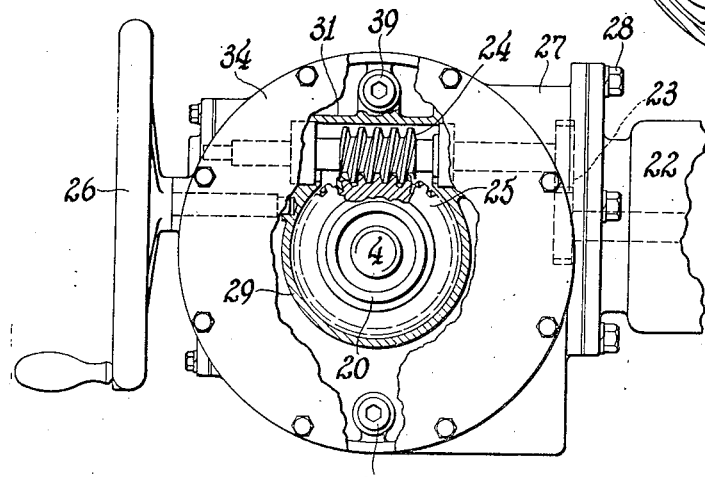
Inventors
Howard E. Hodgson
Clarence W. Kuhn
By Frank H. Hubbard
Attorney Patented Apr. 27, 1943

2,317,529

UNITED STATES PATENT OFFICE 2,317,529

POWER DRIVEN VALVE AND THE LIKE

Howard E. Hodgson and Clarence W. Kuhn, Wauwatosa, Wis., assignors to Cutler-Hammer, Inc., Milwaukee, Wis., a corporation of Delaware Application April 19, 1939, Serial No. 267,143

8 Claims. (Cl. 74—424.8)

This invention relates to power driven valves and the like.

More particularly the invention relates to a valve or the like which is operable through the medium of an axially movable threaded stem and a rotating nut threaded thereon and positively limited in axial movement in one direction and which has a spring pressed member to take the thrust of the nut in a reverse direction, the nut and spring pressed member constituting a thrust responsive assembly attached to the valve or the like in a manner permitting independent attachment to the valve or the like of a suitable power drive mechanism.

The invention has among its objects to provide an improved thrust responsive assembly of the aforesaid character and an improved drive mechanism to be used with a valve or the like equipped with such improved thrust responsive assembly.

Other objects and advantages of the invention will hereinafter appear.

An embodiment of the invention is illustrated in the accompanying drawing, and the same will now be described, it being understood that the embodiment selected for illustration is susceptible of various modifications without departing from the scope of the appended claims.

In the drawing:

Figure 1 shows in longitudinal section a valve yoke containing a screw stem and operating nut, a thrust assembly attached to the yoke, and a drive unit superposed upon the thrust assembly;

Fig. 2 shows a top plan view of Fig. 1 taken at right angles, a part being broken away to show certain elements of the drive; and Fig. 3 is a horizontal sectional view taken on line 3—3 of Fig. 1.

The valve yoke 1 is formed with a socket portion 2 having at its upper end an outwardly extending annular flange 3. The valve stem 4 passes centrally through the socket 2 and has threaded thereon an operating nut 5 having lower ball bearings 6 and upper ball bearings 7. The nut 5 is shouldered at 8 above the bearings 6 and is shouldered at 10 below the bearings 7, and is surrounded by a ring 11 resting on bearings 7.

The flange 3 carries two diametrically opposed upstanding studs 12 and 13 comprising headed bolts threaded into said flange, and on these studs are mounted for axial movement an annular thrust plate 14 and a pressure plate 15 between which plates are interposed a plurality of helical springs 16. The studs 12 and 13 are provided with lock nuts 17 and the thrust plate 14 is formed with hollow projections 18 each surrounding one of said lock nuts and serving to center one of the springs 16. Preferably there are eight springs 16, as shown in Fig. 3, equally spaced, the pressure plate 15 having annular ribs 19 to center the upper ends of said springs. The lower ends of the springs in addition to the two shown in Fig. 1 may be centered by providing the thrust plate 14 with annular ribs similar to the ribs 19 of pressure plate 15.

The thrust plate 14 is peripherally notched as shown in Fig. 3 for a purpose hereinafter set forth, and said plate bears directly on ring 11 superposed upon the nut bearings 7. Thus it will be apparent that the nut 5, the thrust plate 14, the plate 15 and the springs 16, all being held in assembled relation with respect to the valve yoke by the headed studs 12 and 13 constitute a thrust responsive assembly permitting upward axial movement of the nut 5 against the force of springs 16. As will be understood, assuming stem 4 to operate a valve, upward thrust of nut 5 will result from seating of the valve or from expansion or contraction of parts after seating.

The nut 5 is extended upwardly through the thrust plate 14, its upper end as shown being flush with the upper face of said thrust plate. The nut is thus rendered accessible for engagement by a suitable operating member which as shown comprises a rotatable sleeve 20. The sleeve 20 constitutes an operating connection between the nut and the power drive to be hereinafter described. In practice it is preferred to maintain the power drive in a fixed position, and for allowing axial movement of the nut independently of the drive the sleeve 20 and nut are provided with a coupling 21 having longitudinal play. The coupling 21 may be of the jaw type or other preferred type enabling coupling and uncoupling by axial movement of sleeve 20.

The drive mechanism illustrated comprises as shown in Fig. 2 a motor 22 operating through suitable gearing 23, a worm 24 meshing with a worm wheel 25 fixed to sleeve 20. Alternatively the worm 24 may be operated by hand wheel 26 through suitable gearing not shown which may be rendered effective and ineffective in any of the well known ways. The driving gears mentioned are enclosed in a casing 27 to which the motor 22 is suitably attached as by bolts 28.

The casing 27 has a central section 29 in which the sleeve 20 is rotatably mounted, the worm wheel 25 being formed integrally with the sleeve and the central section of the casing having a removable annular portion 30 to be attached after introduction of the sleeve and worm wheel. The casing has adjacent to the central portion 29 a portion 31 to receive the worm 24 and as the chamber housing the worm and worm wheel is provided with a lubricant oil seals 32 and 33 are provided for the sleeve 20. The casing also has a removable cover 34 and a downwardly extending skirt 35 which surrounds the aforedescribed thrust responsive assembly and rests on the flange of the valve yoke adjacent the periphery of the latter. The skirt 35 of the casing overlaps the edge of the yoke flange and has a plurality of inwardly extending lugs or feet 36 (Fig. 3) which rest on the upper surface of the yoke flange, and it is to clear such lugs or feet that the thrust plate 14 is notched at its periphery, as hereinbefore pointed out. Bolts 37 passing upwardly through the yoke flange thread into the lugs or feet 36 of the casing to rigidly secure said casing to the valve yoke for fixed support of said casing and the drive mechanism carried thereby.

As will be apparent, the enclosed drive mechanism constitutes a unit mechanically separate from the thrust responsive assembly and may be mounted on the valve after the thrust responsive assembly is completed and may be removed, leaving the thrust responsive assembly intact. The drive unit may be completely assembled and then slipped over the valve stem and thrust responsive assembly in the desired rotary relation to the valve yoke and when properly placed may be secured to the valve yoke by the bolts 37. On the other hand, the drive unit in its fully assembled state may be readily removed, leaving the thrust assembly intact by merely withdrawing the bolts 37 and then lifting said drive unit.

For convenience in adjusting the thrust responsive assembly the drive unit has mounted in a horizontal wall thereof a pair of downwardly extending screws 38 and 39 to bear on the plate 15 when the drive unit is attached to the valve yoke. The heads of these adjusting screws are readily accessible upon removal of the cover plate 34 of the casing. As will be noted, the adjusting screws in nowise interfere with removal of the drive unit or with positioning of the drive unit on the valve after completion of the thrust responsive assembly. When the drive unit is removed the pressure plate 15 moves upwardly against the heads of the studs 12 and 13 and when the drive unit is superposed upon the thrust responsive assembly the plate 15 is depressed to compress the springs 16 to a degree determined by the adjustment of screws 38 and 39.

In practice the drive mechanism may be controlled in any of the well known ways. For limiting operation of the drive mechanism for valve opening the commonly employed position limit switch would ordinarily suffice. Such a limit switch might also be satisfactory for valve closing, but as will be understood the commonly employed torque limit may optionally be employed for valve closing. The torque limit switch may be of the known mechanical type or of the known electromagnetic type.

What we claim as new and desire to secure by Letters Patent is:

1. In a power driven control apparatus, such as a power controlled valve construction, a threaded actuating spindle therefor, operable between limits of longitudinal movements, one of which limits is fixed, and a base construction in which operates said spindle, mechanism for raising and lowering said spindle, comprising a rotatable nut member upon said spindle, the rotation of which nut member will raise and lower said spindle, a non-rotatable thrust member with respect to which said nut member rotates, said thrust member having rotation preventing association with said base portion and being bodily axially movable together with said nut member, said nut member having thrust transmitting engagement with said thrust member, spring means effective upon said thrust member to yieldingly restrain axial movement thereof and consequently of said nut member away from said base construction, said nut member, and spring pressed thrust member constituting a thrust responsive assembly; drive mechanism for said nut member comprising a housing fixed relative to said base construction and substantially superposed upon said thrust responsive assembly, and a rotary axially non-shiftable power driven member in driving engagement with said axially movable nut member.

2. Mechanism according to claim 1, in which a unitary housing surrounds said thrust responsive assembly and surrounds and supports said drive mechanism, and is fastened to said base construction.

3. Mechanism according to claim 1, in which the nut member is substantially coaxial and endwise adjacent to said power driven member, and in which a lug portion upon the one has driving engagement with a corresponding lug portion of the other member.

4. Mechanism according to claim 1, in which said power driven member is a cylindrical member coaxial with said nut member and having endwise driving engagement therewith.

5. Mechanism according to claim 1, in which the spring means comprise springs arranged around said nut member as nucleus of the thrust responsive assembly.

6. In an operating mechanism for a valve having a non-rotating threaded stem, a nut on the stem and a yoke through which the stem extends, in combination, a casing apertured substantially centrally to receive the valve stem and having a portion to rest upon and to be secured to the valve yoke, said casing having therein at least part of the valve nut and affording the valve nut clearance for limited movement thereof from a normal position along or with the valve stem in a direction away from the valve yoke, a motor carried by said casing, means affording driving connections between said motor and the valve nut and permitting the valve nut the aforementioned limited movement independently of said means and spring thrust means within said casing comprising an annular member receiving with clearance the valve stem and being separate from but movable by and with the valve nut in a direction away from the valve yoke, and a plurality of coil springs mounted to bear against said member at points around the valve stem and to resist the aforementioned movement of said annular member by the valve nut.

7. In an operating mechanism for a valve having a non-rotating threaded stem, a nut on the stem and a yoke through which the stem extends, in combination, a casing apertured substantially centrally to receive the valve stem and having a portion to rest upon and to be secured to the valve yoke, said casing having therein at least part of the valve nut and affording the valve nut clearance for limited movement thereof from a normal position along or with the valve stem in a direction away from the valve yoke, a motor carried by said casing, means affording driving connections between said motor and the valve nut and permitting the valve nut the aforementioned limited movement independently of said means and spring thrust means within said casing comprising an annular member receiving with clearance the valve stem and being separate from but movable by and with the valve nut in a direction away from the valve yoke, and a plurality of coil springs mounted to bear against said member at points around the valve stem and to resist the aforementioned movement of said annular member by the valve nut, said casing together with said motor and said means affording driving connections constituting an assembly to be mounted on and removed from the valve as a unit.

8. In an operating mechanism for a valve having a non-rotating threaded stem, a nut on the stem and a yoke through which the stem extends, in combination, a casing apertured substantially centrally to receive the valve stem and having a portion to rest upon and to be secured to the valve yoke, said casing having therein at least part of the valve nut and affording the valve nut clearance for limited movement thereof from a normal position along or with the valve stem in a direction away from the valve yoke, a motor carried by said casing, means affording driving connections between said motor and the valve nut and permitting the valve nut and the aforementioned limited movement independently of said means and spring thrust means within said casing comprising an annular member receiving with clearance the valve stem and being separate from but movable by and with the valve nut in a direction away from the valve yoke, and a plurality of coil springs mounted to bear against said member at points around the valve stem and to resist the aforementioned movement of said annular member by the valve nut, said casing together with said motor and said means affording driving connections constituting an assembly to be mounted on and removed from the valve yoke as a unit and said unit having separate compartments for said driving connections and said spring thrust means.

HOWARD E. HODGSON.
CLARENCE W. KUHN.